June 3, 1958 R. K. ORTHUBER ET AL 2,837,660

COMPOSITE RADIATION AMPLIFIER

Filed Oct. 13, 1953

INVENTORS
RICHARD K. ORTHUBER
LEE R. ULLERY
BY
Lockwood, Galt, Woodard, & Smith
ATTORNEYS

United States Patent Office 2,837,660
Patented June 3, 1958

2,837,660

COMPOSITE RADIATION AMPLIFIER

Richard K. Orthuber and Lee R. Ullery, Fort Wayne, Ind., assignors to International Telephone and Telegraph Corporation Application October 13, 1953, Serial No. 385,802
17 Claims. (Cl. 250—213)

The present invention relates to a composite radiation amplifier, and more particularly to an amplifier capable of reproducing a given radiation image.

In Orthuber continuation-in-part application Serial No. 332,733, filed January 22, 1953, and other co-pending applications owned by the assignee of this invention, a display-amplifying device of the type broadly contemplated by this invention is disclosed and claimed. The disclosed invention embodiments of these former, co-pending applications were embodied in a laminated cell construction in which the laminae, for all practical purposes, were arranged in the manner of an ordinary parallel plate condenser having a dielectric material interposed between the condenser plates. The dielectric material was actually comprised of two parts; viz., a lamina of photo-conductive material, such as cadmium sulphide, and a contiguous lamina of electroluminescent material excitable to luminescence by the application thereto of a variable electric A. C. field. A typical suitable material for this electroluminescent lamina is a copper activated zinc oxide and zinc sulphide mixture as explained by Destriau in the 1937 edition, vol. 38, of Philosophical Magazine, on pages 700 to 739, 774 to 793, and 800 to 887. Other suitable materials are also described in these pages. Still further, electroluminescent materials which are currently undergoing development for use in illuminating lamps may be incorporated in this invention.

With the application of an exciting alternating voltage to the two plates of the condenser, a voltage drop may be considered to exist therebetween which is the sum of the two voltage drops occurring across the respective two dielectric layers. By designing these dielectric layers in a predetermined manner, the electroluminescent dielectric may be prevented from luminescing in the absence of exciting light, but, on the other hand, caused to luminesce when light energy is projected onto the photo-conductive layer. These two dielectric layers may be considered as electrically connected in series, whereupon illumination of a photo-conductive layer alters the electrical characteristics thereof so as to change the distribution of voltages across the two individual layers in a direction to increase the magnitude of the voltage applied to the electroluminescent layer. With this increase of voltage, the electroluminescent layer will emit light of such brightness as corresponds to the change in electrical characteristics of the photo-conductive layer.

The present invention differs primarily from the foregoing in the respect that its resultant operation is opposite. That is to say, the former invention reproduces a picture or image in positive form, whereas the present invention serves to reproduce an image in negative form.

Amplifier cells of both the former and present inventions have particular utility in the reproduction of television and motion picture displays. These cells provide amplification of the image projected thereon, whereby an image of low brightness produced by a relatively small television picture tube may be magnified many times and reproduced in highly brightened condition for clear observation.

In view of the foregoing, it is an object of this invention to provide a composite radiation amplifier for reproducing a radiation image in negative form.

It is another object of this invention to provide a radiation display amplifier of laminated construction which is composed of a dielectric material of intermixed photo-conductive and electroluminescent particles.

It is a still further object of this invention to provide a novel method of controlling the excitation of electroluminescent material.

In accordance with the principles of this invention, a radiation amplifying device is provided which includes an electroluminescing composite responsive to the conjoint effects of radiant energy and a variable electric field, this composite comprising both electroluminescent and photosensitive materials so intermingled and disposed relative to each other that incident radiation on the photo-conductive material will serve to vary the exciting electric field applied to the electroluminescent layer. The photo-sensitive material possesses such properties as will cause the resistance thereof to vary correspondingly with incident radiation.

For a better understanding of the invention, together with other and further objects thereof, reference is made to the following description, taken in connection with the accompanying drawings, the scope of the invention being defined by the appended claims.

Figures 1, 2:
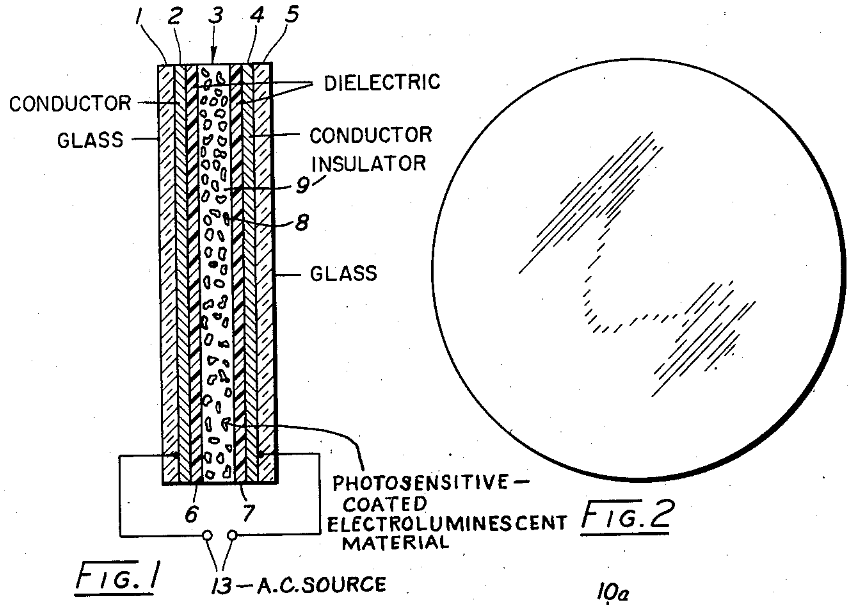
Fig. 1 is a sectional illustration of one embodiment of this invention.
Fig. 2 is a front elevation thereof.

Referring to Figs. 1 and 2 of the drawings, the display amplifier is of a laminated assembly of planar construction, and may be of any suitable configuration, such as the circular form shown in Fig. 2. The laminations of this assembly comprise a glass or the like supporting disc 1, a transparent film of conductive material 2, such as evaporated silver applied to one side of the disc 1, a relatively thick layer of composite dielectric phosphor material 3, another film 4 of conductive material which may be identical to the material of film 2, and a supporting glass disc 5 mounted on the film 4. In some arrangements, it is preferable to use two dielectric layers 6 and 7, respectively, on opposite sides of the composite layer 3 for a purpose which will be explained more fully hereinafter. These layers 6 and 7 may be comprised of any suitable dielectric material, such as cellulose acetate, polystyrene, etc., the particular type of material used depending upon the operating characteristics desired of the finished amplifier.

The relatively thick dielectric layer 3 is composed of electroluminescent particles 8 which are randomly distributed throughout the mass of an insulating carrier material 9. This material 9 may be of any suitable plastic composition, such as cellulose acetate or polystyrene, which may be solidified from a fluid state after a suitable quantity of the particles 8 have been introduced thereinto.

Figure 4:
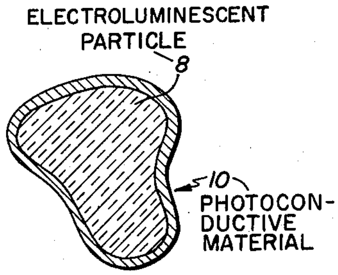
Fig. 4 is an enlargement of one particle of the composite dielectric material utilized in the arrangement of Fig. 1.

In one arrangement, the electroluminescent particles 8 are covered with a thin film 10 of photo-conductive material, such as cadmium sulphide, as illustrated in Fig. 4. One suitable method for applying this thin film to the electroluminescent particles 8 comprises the steps of supporting a quantity of the particles 8 on a thin mesh screen while the cadmium sulphide is being evaporated thereonto in accordance with known techniques. In order to insure a fairly uniform coating of the film 10 over the individual particles, the screen may be gently agitated, These coated particles 8 may thereafter be introduced into a liquid plastic material having suitable insulating properties, the plastic material thereafter being solidified to form the layer 3.

Figure 3:
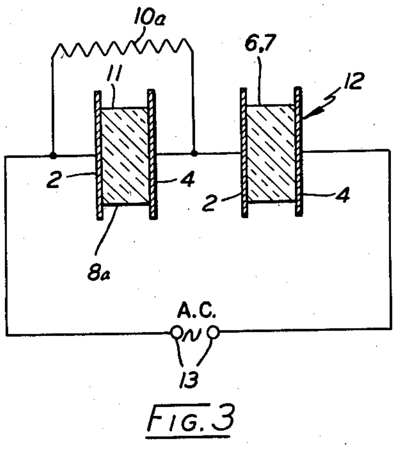
Fig. 3 is an equivalent circuit diagram of the embodiment of Fig. 1.

Referring now to Fig. 3, the parallel condenser 11 and resistor 10*a* circuit may be considered as the electrical equivalent of the single particle of Fig. 4. The resistor 10*a* represents the photo-conductive film 10, and the dielectric material 8*a* of the condenser 11 may be considered as the electroluminescent particle 8. The two condenser plates are the two film electrodes 2 and 4, respectively. The condenser 12 is composed of the two film electrodes 2 and 4 and the dielectric material 6 and 7. By reason of the physical arrangement of the various laminations of the amplifier, these two condensers 11 and 12 may be considered to be connected in series.

Considering that the amplifier of Fig. 1 is located in a completely darkened enclosure, the resistance of the photo-conductive film 10 (and equivalent resistor 10*a*) will be a maximum. With the application of an alternating exciting voltage of suitable amplitude and frequency to the terminals 13, a division of voltages will occur across the two condensers 11 and 12 as determined by the impedance characteristics of both condensers in combination with the resistor 10*a*. The potential applied to the terminals 13 is so selected that electroluminescent particle 8 and all similar particles will be caused to luminesce when the film 10 (or resistor 10*a*) is submerged in darkness, or in other words, caused to produce maximum resistance. Thus with no light projecting onto, for example, the left-hand face of the amplifier layer 3, the potential drop across the individual particles 8 will be a maximum, causing normal luminescing thereof.

In the presence of light, the resistance of the film 10 (or resistor 10*a*) will lower thereby reducing the voltage or field developed across the individual particles 8 and increasing the potential across the relatively high impedance condenser 12, whereupon luminescence of the particle 8 will be correspondingly lower.

Considering the two extremes of incident illumination, absence of light on the layer 3 will cause the electroluminescent particles to luminesce with maximum brightness whereas maximum illumination on the layer 3 will serve to extinguish such luminescence.

In view of the foregoing, it will be obvious that since the photo-conductive film 10 surrounds the respective electroluminescent particles 8, irradiation by these particles will serve to excite and reduce the resistance of the photo-conductive film 10 causing a reduction of the exciting field potential across the respective particles 8. Thus, without some provision for preventing the cumulative effects of this light feed-back, the electroluminescent particles 8 will immediately extinguish by virtue of the reduced exciting field.

This optical feed-back may be controlled. It is dependent upon the inherent time lag in the response of photo-sensitive materials, such as the cadmium sulphide material 10, to changes in exciting illumination. It is known that the internal photo-current generated in photo-conductors by sudden application of a square wave light pulse does not instantaneously follow the leading edge of the light pulse. It is therefore possible to prevent the composite amplifier and particularly the layer 3 from reaching a saturated condition by applying the alternating electric field to the terminals 13 in phased impulses, with the duration of each field impulse being shorter than the time required for the photo-conductive material 10 to reach saturation as a result of the light feed-back from the electroluminescent particles 8 or to even respond thereto. During the occurrence of each of these field impulses, optical feed-back from the particles 8 to the photo-conductor 10 is allowed to occur, but just prior to this feed-back becoming perceptible in producing a reduction of luminescence of the particles 8, the exciting field impulse is removed, and is cut off for a period long enough to enable the photo-conductor to return to its fundamental or dark resistivity characteristic. Therefore, the field impulse frequency and duration of the field impulse must be adapted to the build-up and decay-time constant of the photo-conductive layer. In most instances, the electroluminescent materials respond with negligible time delay to changes in the exciting field, but in these situations where the response is not sufficiently rapid, the parameters of the exciting field must be adapted to both response characteristics of the photo-sensitive and electroluminescent materials, respectively.

Summarizing briefly, in the case of reproducing a complex optical image having light and dark areas and projected onto the left-hand face of the amplifier, optical feed-back will be greatest in the darkest areas of the projected image and correspondingly less in the high-light areas. The alternating current field applied to the terminals 13 shall, therefore, be applied for a period of time sufficient to allow the feed-back from the electroluminescent particles 8 to just perceptibly affect the photo-conductivity of the cadmium sulphide 10, at which time the alternating current field is removed for a sufficiently long period of time to allow the materials, especially the photo-conductor 10, to return to its normal dark resistivity. Obviously, the duration of the impulses and the spacing between impulses will be determined by the particular material used and the desired operating characteristics of the amplifier itself. Operating properly, the amplifier reproduces the aforesaid complex image which may be observed on the right-hand side thereof.

A suitable operating potential for exciting the electroluminescent particles 8 is 800 volts at 400 cycles per second. However, other values of exciting potentials may be used depending upon the particular electroluminescent material used, and the operating characteristics desired of the amplifier itself.

Figure 5:
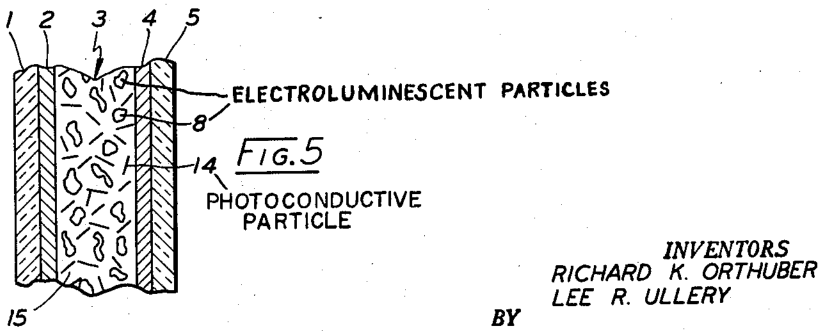
Fig. 5 is a fragmentary section of another embodiment of this invention.

Referring now to Fig. 5, like numerals will indicate like parts. In the embodiment of this figure, the layer 3 is composed of electroluminescent particles 8 and photo-conductor particles 14, which are homogeneously intermixed and distributed throughout a solidified plastic carrier material indicated by the reference numeral 15. These photo-conductor particles 14 may consist of the usual cadmium sulphide crystals responsive to incident illumination in the respect of changing resistance. The plastic material 15 may be comprised of the same material as used in the embodiment of Fig. 1, and may consist of fluid cellulose acetate filled with the particles 8 and 14 subsequently solidified into a suitable sheet-like form as in the case of Fig. 1.

Operation of this embodiment may be considered as identical to that of the embodiment of Fig. 1, the cadmium sulphide particles 14 serving to control the magnitude of the electric field applied to the electroluminescent, dielectric particles 8 between the film electrodes 2 and 4, and which for convenient understanding in operation may be considered as constituting a resistor connected in parallel with the condenser comprised of the two plates 2 and 4 and dielectrical material 8.

If it is desired to use a continuous wave of exciting voltage for application to the terminals 13 instead of the pulsed excitation previously explained, it is only necessary to use a photo-conductive material 10 or 14 which is not responsive to radiation in the spectral range of the particles 8.

While there has been described what is at present considered the preferred embodiment of the invention, it will be obvious to those skilled in the art that various changes and modifications may be made therein without departing from the invention, and it is, therefore, intended in the appended claims to cover all such changes and modifications as fall within the true spirit and scope of the invention.

What is claimed is:

1. A radiation handling device which includes an electroluminescing composite material responsive to radiant energy, comprising electroluminescent means which luminesces when subjected to a variable electric field, and photosensitive means electrically coupled in shunt with said electroluminescent means, said photo-sensitive means having an electrical impedance which varies with the intensity of incident radiation.

2. A radiation handling device which includes an electroluminescing composite material responsive to radiant energy, comprising electroluminescent means which luminesces when subjected to a variable electric field, photosensitive means electrically in shunt with said electroluminescent means, said photosensitive means having an electrical impedance which varies with the intensity of incident radiation thereon, and electrode means for applying an electric field to said composite material whereby the electroluminescent means may be excited to luminescence.

3. A radiation handling device which includes an electroluminescing composite body responsive to radiant energy, comprising electroluminescent material which luminesces when subjected to a variable electric field, photoconductive material intermixed with said electroluminescent material, said photoconductive material having electrical resistivity properties which vary correspondingly with the intensity of incident radiation thereon, and electrode members provided on different sides of said composite body for applying an energizing electric field thereto, said photoconductive and electroluminescent materials being electrically intercoupled whereby incident radiation on the photoconductive material serves to reduce the magnitude of said field between said electrode members thereby reducing the magnitude of the electric field applied to said electroluminescent material.

4. The device of claim 1 wherein the electroluminescent means is composed of a pluarlity of particles and the photosensitive means covers each particle in the form of a film.

5. The device of claim 3 wherein the electroluminescent and photo-conductive materials are composed of discrete particles which are intermixed.

6. The device of claim 3 wherein the intermixed photoconductive and electroluminescent materials are formed into a sheet-like layer and the electrode members are correspondingly sheet-like and are provided on opposite sides of said layer.

7. A radiation handling device of laminated construction comprising a layer of dielectric material composed of intermingled photo-conductive and electroluminescent materials held together by means of an insulating material, and two transparent plate-like electrodes provided on opposite sides of said layer whereby an electric field may be applied to the latter for exciting said electroluminescent material.

8. A radiation-handling device comprising electroluminescent phosphor material, photosensitive material intermixed with said phosphor material, and means for applying an electric field to said phosphor and photosensitive material, said photosensitive material having an electrical impedance which varies with the intensity of incident radiation.

9. A radiation handling device which includes an electroluminescing composite body responsive to radiant energy, comprising electroluminescent material which luminesces when subjected to a variable electric field, photoconductive material carried by said electroluminescent material such that both materials are electrically in shunt, said photoconductive material having an electrical impedance which varies with the intensity of incident radiation, and electrode members operatively coupled to said composite body for applying an energizing electric field thereto.

10. A radiation handling device which includes an electroluminescing composite body responsive to radiant energy, comprising electroluminescent material which luminesces when subjected to a variable electric field, photoconductive material covering said electroluminescent material to be coupled electrically in parallel thereto, said photoconductive material having an electrical impedance which varies with the intensity of incident radiation, and electrode members operatively coupled to said composite body for applying an energizing electric field thereto.

11. A radiation handling device which includes an electroluminescing composite body responsive to radiant energy, comprising electroluminescent material which luminesces when subjected to a variable electric field, crystalline photoconductive particles dispersed throughout said composite body, said photoconductive material having an electrical impedance which varies with the intensity of incident radiation, and electrode members provided on different sides of said composite body for applying an energizing electric field thereto.

12. A radiation-handling device comprising electroluminescent phosphor material, photosensitive material intermixed with said phosphor material, and means for applying periodic electrical field impulses to said phosphor and photosensitive material.

13. In combination, a radiation handling device which includes an electroluminescing composite body responsive to radiant energy, comprising electroluminescent material which luminesces when subjected to a variable electric field, photoconductive material carried by said electroluminescent material such that both materials are electrically in shunt, said photoconductive material having an electrical impedance which varies with the intensity of incident radiation, means for applying an energizing electric field to said composite body, and a source of periodic impulses of electrical energy coupled to said last-named means, the duration of each impulse corresponding to the response time of said photosensitive material to radiation from said electroluminescent material.

14. A radiation handling device which includes an electroluminescing composite body responsive to radiant energy, comprising electroluminescent material which luminesces when subjected to a variable electric field, photoconductive material carried by said electroluminescent material such that both materials are electrically in shunt, said photoconductive material having an electrical impedance which varies with the intensity of incident radiation, said photoconductive material being insensitive to the radiation of said electroluminescent material.

15. A radiation-handling device comprising a body of electroluminescent phosphor, a body of photosensitive material electrically coupled to said phosphor body, and a body of dielectric material electrically in series with said phosphor and photosensitive bodies, said dielectric body having an impedance characteristic which produces a drop in potential thereacross.

16. A radiation-handling device comprising two plate-like conductive elements, two dielectric layers sandwiched between said elements to provide a capacitive coupling between said elements, one layer comprising electroluminescent phosphor material and photosensitive material electrically in shunt, said photosensitive material having an electrical impedance which varies with the intensity of varying incident radiation, said two layers dividing an electrical field applied to said elements in accordance with the respective impedances thereof.

17. A radiation-handling device comprising electroluminescent phosphor material, photosensitive material intermixed with said phosphor material, and means for controlling optical feedback between the phosphor material and the photosensitive material.

References Cited in the file of this patent

UNITED STATES PATENTS

| | | |
|---|---|---|
| 2,555,545 | Hunter et al. | June 5, 1951 |
| 2,594,740 | De Forest et al. | Apr. 29, 1952 |
| 2,650,310 | White | Aug. 25, 1953 |
| 2,692,948 | Lion | Oct. 26, 1954 |